United States Patent
Maurer et al.

(10) Patent No.: US 9,830,064 B2
(45) Date of Patent: *Nov. 28, 2017

(54) RENDERING MAP IMAGES USING MODIFICATIONS OF NON-RASTER MAP DATA

(71) Applicant: GOOGLE INC., Mountain View, CA (US)

(72) Inventors: Jennifer Maurer, Seattle, WA (US); Sean Egan, Seattle, WA (US)

(73) Assignee: GOOGLE INC., Mountain View, CA (US)

(*) Notice: Subject to any disclaimer, the term of this patent is extended or adjusted under 35 U.S.C. 154(b) by 230 days.

This patent is subject to a terminal disclaimer.

(21) Appl. No.: 14/589,797

(22) Filed: Jan. 5, 2015

(65) Prior Publication Data

US 2015/0128090 A1    May 7, 2015

Related U.S. Application Data

(63) Continuation of application No. 13/244,741, filed on Sep. 26, 2011, now Pat. No. 8,928,691.

(51) Int. Cl.
*G09G 5/00* (2006.01)
*G06F 3/0484* (2013.01)
(Continued)

(52) U.S. Cl.
CPC ......... *G06F 3/04847* (2013.01); *G01C 21/32* (2013.01); *G01C 21/36* (2013.01);
(Continued)

(58) Field of Classification Search
None
See application file for complete search history.

(56) References Cited

U.S. PATENT DOCUMENTS

| 5,519,809 A | 5/1996 | Husseiny et al. |
| 5,864,632 A | 1/1999 | Ogawa et al. |

(Continued)

FOREIGN PATENT DOCUMENTS

| CN | 101246597 A | 8/2008 |
| EP | 2 078 926 A1 | 7/2009 |

(Continued)

OTHER PUBLICATIONS

Bing Maps AJAX Control, Version 7.0 (2011).

(Continued)

*Primary Examiner* — Peter Hoang
(74) *Attorney, Agent, or Firm* — Marshall, Gerstein & Borun LLP

(57) ABSTRACT

First map data is generated in a vector format for displaying a first map image at a client device. The first map image corresponds to a perspective of a camera panned to a certain location at a certain zoom level. The first map data is provided to the client device via a communication network. Modification data is generated at a map server in a vector format, the modification data specifying a difference between the first map data and a second map data, where the second map data is for displaying a second map image corresponding to the same perspective of the camera panned to the same location at the same zoom level. The modification data is provided to the client device via the communication network for generating the second map image using the first map data and the modification data.

14 Claims, 7 Drawing Sheets

(51) Int. Cl.
*G09G 5/14* (2006.01)
*G01C 21/36* (2006.01)
*G06T 11/20* (2006.01)
*G06T 19/00* (2011.01)
*G01C 21/32* (2006.01)
*G09B 29/10* (2006.01)
*H04L 29/08* (2006.01)

(52) U.S. Cl.
CPC .......... *G01C 21/367* (2013.01); *G06T 11/20* (2013.01); *G06T 19/006* (2013.01); *G09B 29/106* (2013.01); *G09G 5/00* (2013.01); *G09G 5/14* (2013.01); *H04L 67/02* (2013.01); *G09G 2354/00* (2013.01); *G09G 2370/022* (2013.01); *G09G 2380/10* (2013.01)

(56) References Cited

U.S. PATENT DOCUMENTS

| | | | |
|---|---|---|---|
| 5,966,135 | A | 10/1999 | Roy et al. |
| 6,314,370 | B1 | 11/2001 | Curtright |
| 6,388,684 | B1 | 5/2002 | Iwamura et al. |
| 6,577,714 | B1 | 6/2003 | Darcie et al. |
| 7,142,217 | B2 | 11/2006 | Howard et al. |
| 7,308,117 | B2 | 12/2007 | Chitradon et al. |
| 7,734,412 | B2 | 6/2010 | Shi et al. |
| 7,844,417 | B2 | 11/2010 | Du |
| 7,865,301 | B2 | 1/2011 | Rasmussen et al. |
| 7,933,897 | B2 | 4/2011 | Jones et al. |
| 7,945,546 | B2 | 5/2011 | Bliss et al. |
| 8,010,407 | B1 | 8/2011 | Santoro et al. |
| 8,014,946 | B2 | 9/2011 | Rasmussen et al. |
| 8,041,506 | B2 | 10/2011 | Bliss et al. |
| 8,681,176 | B1 | 3/2014 | Maurer et al. |
| 8,928,691 | B2 | 1/2015 | Maurer et al. |
| 2002/0113797 | A1 | 8/2002 | Potter et al. |
| 2003/0229441 | A1 | 12/2003 | Pechatnikov et al. |
| 2004/0217980 | A1 | 11/2004 | Radburn et al. |
| 2005/0285876 | A1 | 12/2005 | Balaga et al. |
| 2006/0041375 | A1 | 2/2006 | Witmer et al. |
| 2006/0074547 | A1 | 4/2006 | Kaufman et al. |
| 2006/0074660 | A1 | 4/2006 | Waters et al. |
| 2006/0139375 | A1 | 6/2006 | Rasmussen et al. |
| 2006/0170693 | A1 | 8/2006 | Bethune et al. |
| 2006/0271281 | A1 | 11/2006 | Ahn et al. |
| 2006/0293847 | A1 | 12/2006 | Marriott et al. |
| 2007/0016651 | A1 | 1/2007 | Blagsvedt et al. |
| 2007/0021908 | A1 | 1/2007 | Jaugilas et al. |
| 2007/0050340 | A1 | 3/2007 | von Kaenel et al. |
| 2007/0098211 | A1 | 5/2007 | Walton et al. |
| 2007/0118520 | A1 | 5/2007 | Bliss et al. |
| 2007/0176796 | A1 | 8/2007 | Bliss et al. |
| 2007/0208498 | A1 | 9/2007 | Barker et al. |
| 2007/0210937 | A1 | 9/2007 | Smith et al. |
| 2007/0226314 | A1 | 9/2007 | Eick et al. |
| 2007/0245238 | A1 | 10/2007 | Fugitt et al. |
| 2008/0016472 | A1 | 1/2008 | Rohlf et al. |
| 2008/0109159 | A1 | 5/2008 | Shi et al. |
| 2008/0238941 | A1 | 10/2008 | Kinnan et al. |
| 2009/0089149 | A1 | 4/2009 | Lerner et al. |
| 2009/0113296 | A1 | 4/2009 | Lacy et al. |
| 2009/0157718 | A1 | 6/2009 | Owen, Jr. et al. |
| 2009/0198767 | A1 | 8/2009 | Jakobson et al. |
| 2009/0271718 | A1 | 10/2009 | Balaishis et al. |
| 2010/0073391 | A1 | 3/2010 | Horowitz et al. |
| 2010/0114941 | A1 | 5/2010 | von Kaenel et al. |
| 2010/0118025 | A1 | 5/2010 | Smith et al. |
| 2010/0194784 | A1 | 8/2010 | Hoff et al. |
| 2010/0201707 | A1 | 8/2010 | Rasmussen et al. |
| 2010/0321399 | A1 | 12/2010 | Ellren et al. |
| 2011/0004830 | A1 | 1/2011 | Von Kaenel et al. |
| 2011/0153186 | A1 | 6/2011 | Jakobson |
| 2011/0172909 | A1 | 7/2011 | Kahn et al. |
| 2011/0177845 | A1 | 7/2011 | Fasold |
| 2011/0191014 | A1 | 8/2011 | Feng et al. |
| 2011/0208724 | A1 | 8/2011 | Jones et al. |
| 2011/0267369 | A1 | 11/2011 | Olsen |
| 2011/0306304 | A1 | 12/2011 | Forutanpour et al. |
| 2013/0076784 | A1 | 3/2013 | Maurer et al. |
| 2014/0340419 | A1 | 11/2014 | Otero et al. |

FOREIGN PATENT DOCUMENTS

| | | |
|---|---|---|
| EP | 2 290 322 A1 | 3/2011 |
| JP | 11-232433 A | 8/1999 |
| JP | 2004-062182 A | 2/2004 |
| JP | 2004-157013 A | 6/2004 |
| WO | WO-2014/186509 A1 | 11/2014 |

OTHER PUBLICATIONS

Bing Services, "Getting Started with V4 of the API (Part 1)," Microsoft (2011). Retrieved from the Internet on Sep. 26, 2011: URL:http://msdn.microsoft.com/en-us/library/aa907678.aspx.

Bo et al., "Progressive Transmission of Vector Map on the Web," XXIST Congress of the International Society for Photogrammetry and Remote Sensing (2008).

Extended European Search Report for Application No. 12836138.3, dated Mar. 18, 2015.

Follin et al., "Multi-Resolution Extension for Transmission of Geodata in a Mobile Context," Computers & Geosciences, 31:179-188 (2005).

International Preliminary Report on Patentability for Application No. PCT/US2012/057104, dated Apr. 1, 2014.

International Search Report and Written Opinion for Application No. PCT/US2012/057104, dated Feb. 27, 2013.

International Search Report and Written Opinion for Application No. PCT/US2014/038077, dated Sep. 11, 2014.

Mac Aoidh et al., "Personalization in Adaptive and Interactive GIS," *Annals of GIS*, 15(1):23-33 (2009).

Neoseeker, "Bing Maps Combines Raster Tiles and Vector Graphics for Enhanced Experience," Neo Era Media Inc. (1999-2011). Retrieved from the Internet on Sep. 26, 2011: URL:http://www.neoseeker.com/news/14507-bing-maps-combines-raster-tiles-and-vector-graohics-for-enhanced-experience.

Sample et al., "Tile-Based Geospatial Information System: Principles and Practices," pp. xi-xiv, 193-203 (Springer 2010).

Zhang et al., "Transmission and Visualization of Large Geographical Maps," ISPRS Journal of Photogrammetry and Remote Sensing, 66:73-80 (2011).

U.S. Appl. No. 13/237,830, filed Sep. 20, 2011.

U.S. Appl. No. 13/244,808, filed Sep. 26, 2011.

Aoki, "Terrain Map with Shadow Now Displayable in 'Google Maps'," (2007). Retrieved from the Internet at: URL:http://internet.watch.impress.co.jp/cda/news/2007/11/28/17662.html.

Follin et al., "Multi-Resolution Extension for Transmission of Geodata in a Mobile Context," *Computers and Geosciences*, 31(2):179-188 (2005).

Office Action for Japanese Application No. 2014-532094, dated Oct. 17, 2016.

Suzuki, "Railroad Map in Google Maps," (2009). Retrieved from the Internet at: URL:http://japan.googleblog.com/2009/04/google_03.html.

Office Action for Chinese Application No. 201280057194.8, dated Nov. 30, 2016.

Office Action for Chinese Application No. 201280057194.8, dated Jan. 28, 2016.

Examination Report for Australian Application No. 2012316227, dated Oct. 18, 2016.

Office Action for Japanese Application No. 2014-532094, dated Jun. 28, 2017.

RENDERING MAP IMAGES USING MODIFICATIONS OF NON-RASTER MAP DATA

FIELD OF THE DISCLOSURE

The present disclosure relates to map rendering systems, such as electronic map display systems, and more specifically to a map rendering system in which map images are rendered using map data provided in a non-raster format.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, maps of geographic regions may be displayed by software applications running on a wide variety of devices, including mobile phones, car navigation systems, hand-held global positioning system (GPS) units, and computers. Depending on the application and/or user preferences, maps may display topographical data, street data, urban transit information, traffic data, etc. Further, some applications display maps in an interactive mode, so that a user may operate various controls (radio buttons, scrollbars, etc.) to change the zoom level or pan the "camera" to a new location, for example. A user in some cases also may select or unselect the display of certain information. For example, the user may operate the appropriate control to turn on the display of bicycle trails.

To render a map image, a device typically receives raster images from a dedicated server. For example, a map server may operate on the Internet and provide images in a Portable Network Graphics (PNG) format to various client devices for the specified geographic regions. While raster images are relatively easy to render at a client device, raster image data typically requires a large amount of storage space for a comprehensive map. Also, it is difficult to efficiently manipulate raster images at a client device. For example, to zoom in on a selected region, either new raster image data is retrieved from the server, or the available raster image data is enlarged with a noticeable loss in quality.

SUMMARY

In an embodiment, a computer-implemented method for providing map data to a client device includes generating several vector descriptors for rendering, at the client device, a first map image for a selected geographic region, where each vector descriptor indicates a geometry of a respective map element in accordance with a vector graphics format. The method further includes causing the vector descriptors to be transmitted to the client device via the communication network, receiving an indication that a second map image for the selected geographic region is to be rendered at the client device, such that the second map image is different from the first map image, generating a modification indication that indicates a set of one or more vector descriptors, each of which corresponds to a respective map element that is rendered in one but not both of the first map image and the second map image, and causing the modification indication to be transmitted to the client device via the communication network for rendering the second map image using at least some of the vector descriptors and the modification indication.

In another embodiment, a tangible non-transitory computer-readable medium stores instructions that, when executed by one or more processors, cause the one or more processors to generate map data in a non-raster format for a selected geographic region, where the map data is interpretable at a client device to generate a first map image in a raster format and cause the map data to be transmitted to the client device via a communication network. Further, the instructions, when executed by one or more processors, cause the one or more processors to receive, from the client device, an indication that a second map image for the selected geographic region is to be rendered at the client device, generate a modification indication descriptive of one or more modifications to the map data for transforming the first map image into the second map image, and cause the modification indication to be transmitted to the client device via a communication network for rendering the second map image in the raster format at the client device using at least a portion of the map data and the modification indication.

In another embodiment, a method in a computing device for generating map images includes receiving, via a communication network, several vector descriptors for rendering a first map image for a selected geographic region, where each vector descriptor indicates a geometry of a respective map element in accordance with a vector graphics format and rendering the first map image using the plurality of vector descriptors. The method also includes receiving, via the communication network, a modification indication that indicates a modification of the several vector descriptors for rendering a second map image for the selected geographic region and rendering the second map image for the selected geographic region using at least some of the vector descriptors and the modification indication.

In yet another embodiment, a computing device operating in a communication network includes a processor, a memory coupled to the processor, a network interface for communicating via the communication network, and several routines stored in the memory. A first routine executes on the processor to cause a request for map data corresponding to a selected geographic region to be transmitted via the network interface. A second routine executes on the processor to render a first map image using a plurality of vector descriptors received via the network interface in response to the request, where the plurality of vector descriptors is in a non-raster format. A third routine executes on the processor to cause a request for modification data corresponding to the selected geographic region to be transmitted via the network interface. A fourth routine executes on the processor to render a second map image using at least some of the plurality of vector descriptors and the modification data.

DETAILED DESCRIPTION

Figure 1:
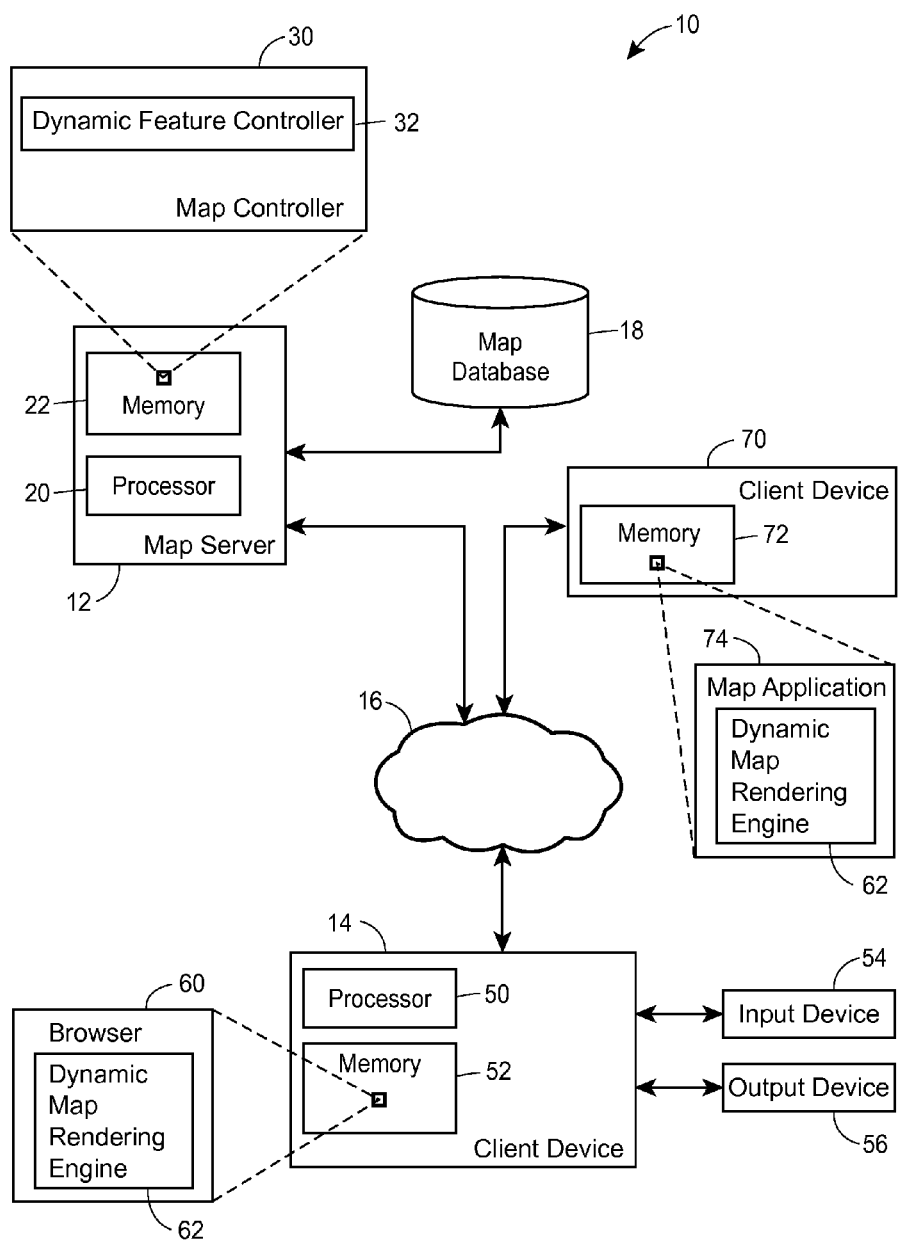
FIG. 1 is a block diagram of a system in which a server provides map data to a client device map data for rendering a map image, and subsequently provides modification data for rendering another map image for the same geographic region using some or all of the originally provided map data and the modification data, according to an embodiment.

In embodiments of systems and methods discussed below, a map server efficiently provides map data for rendering map images to a client device. According to some embodiments, after the map server provides map data to a client device for rendering a first map image (e.g., a basic map image) corresponding to a certain area or geographic region, the map server provides modification data to the client device for rendering a second, different map image (e.g., a traffic map image) corresponding to the same area. The client device then may render the second map image using the map data previously provided for rendering the first map image and the modification data, and the map server need not necessarily provide map data used in rendering both the first map image and the second image to the client device more than once. Depending on the scenario, the modification data may include one or more additions to the previously provided map data, deletions of one or several portions of the previously provided map data, or modifications of one or several portions of the previously provided map data.

In an embodiment, the map server provides map data in a non-raster format, and the client interprets some or all of the map data to generate the first map image and the second map image as a respective raster images. The map data additionally may include text data to specify map labels to be displayed with individual or aggregate map elements. To render the first map image, the client device may request map data from the map server via a communication network, and the map server in response may provide map data that describes map content according to a vector graphics format. The map data may specify various geometric shapes (e.g., using mathematical descriptions of points and paths connecting the points) and indicate how these shapes should be positioned for rendering various map elements such as roads, buildings, parks, bodies of water, etc. For example, rather than specifying each pixel that makes up a raster image of a line segment, a vector-based description of the line segment may specify the two endpoints of the line segment and indicate that the two endpoints are connected by a straight line. Vector-based descriptions of map elements may be referred to herein as vector descriptors or simply vectors, and a set of one or several vector descriptors may be referred to as vector data. Further, an individual map element (e.g., a building) or an aggregation of several map elements (e.g., buildings, parks, bicycle paths, and pedestrian paths of a college campus) in some scenarios may define a map feature (or simply feature). In an embodiment, a map feature is assigned a unique identifier which the map server and the map client may utilize for identification. In general, a map feature may be described using one or more vector descriptors.

The client device may request map data for rendering the first map image and the second map image in response to respective user commands, for example. The user commands may indicate a selection of a different map type, a different zoom level, etc. According to an example scenario, a user selects a geographic region and a basic map type, e.g., the type of a map that illustrates roads, streets, major landmarks, etc. The client device generates a request for rendering a map image and transmits the request to the map server, which in response provides map data in a vector graphics format (or other non-raster format suitable for rendering a raster image at the client device). The map data may include several vector descriptors and, in some cases, additional data such as style data, label data, etc. More specifically, label data may include characters in the American Standard Code for Information Interchange (ASCII) format, a Unicode format, or any other suitable character format. The client device then interprets the map data to render the map image and display the map image on a display device. To continue with the scenario above, the user then may select a transit map for the same geographic region, and the client device in response may generate an indication that a new map image corresponding to a transit map is to be generated and transmit the indication to the map server. According to one implementation, the client device generates a request for map data of the new type (e.g., "provide map data for a transit map of region R"), and the map server checks previous communications with the client device to determine what kind of map data was previously sent to, and therefore is already available at, the client device. In another implementation, the client device specifies what kind of map data for the selected region is already available at the client device in addition to requesting map data of the new type (e.g., "provide map data for a transit map of region R, given that I already have map data for a basic map of region R at the same zoom level"). The map server in this case does not need to know what map data, if any, was previously sent to the client device. More generally, a history of transactions between a map server and a client device may be maintained by the map server and/or the client device.

The map server then may determine which map elements and labels must be added to, removed from, or modified in the map data already available at the client device. For example, the map server may determine how a basic map for a certain region and a certain zoom level differs from a transit map for the same region and the same zoom level, and generate an appropriate modification indication. For example, the modification indication may include vector descriptors for rendering subway lines not included in the basic map image. The map server then provides the modification indication to the client device for rendering the transit map image using, at least partially, the map data provided for rendering the basic map image as well as the modification indication.

These and other example scenarios in which map data for rendering map images is efficiently provided to a client device are further discussed with reference to the accompanying drawings. Some of the figures may have been simplified by the omission of certain elements for the purpose of more clearly showing other elements. Such omissions of elements in some figures are not necessarily indicative of the presence or absence of particular elements in any of the exemplary embodiments, except as may be explicitly delineated in the corresponding written description.

First referring to FIG. 1, techniques for transferring map data may be implemented in a system 10. In an embodiment, the system 10 includes a map server 12, a client device 14 communicatively coupled to the map server 12 via a network 16, and a map database 18 communicatively coupled to the map server 12. The network 16 may be a wide area network (WAN) such as the Internet, a local area network (LAN), or any other suitable type of a network. Depending on the embodiment, the map database 18 may be coupled to the map server 12 via the network 16 or via another communication link as illustrated in FIG. 1. For simplicity, only one instance of the map server 12, the client device 14, and the map database 18 is illustrated in FIG. 1. However, in other embodiments, the system 10 may include more than one map server 12, more than one client device 14, and/or more than one map database 18.

The map server 12 may include a processor 20 and a computer-readable memory 22 that stores a map controller 30 in the form of computer instructions, for example, that may be executable on the processor 20 directly (e.g., as compiled code) or indirectly (e.g., as a script interpreted by another application executing on the processor 20). The computer-readable memory 22 may include volatile memory to store computer instructions and data on which the computer instructions operate at runtime (e.g., Random Access Memory or RAM) and, in an embodiment, persistent memory such as a hard disk, for example. In an embodiment, the map controller 30 includes a dynamic feature controller 32 that generates vector data for various map elements and/or map features including one or more map elements that are provided as map content to the client device 14. The dynamic feature controller 32 also may be configured to determine the difference in a vector-based description of a map image relative to another map image corresponding to the same geographic area, generate an appropriate modification indication, and provide the modification indication to the client device 12. In other words, rather than providing a complete vector-based description of a map image, the dynamic feature controller 32 can efficiently provides a description of modifications of a previously provided vector-based description of another map image.

To generate a modification indication, the dynamic feature controller 32 compares a serialized representation of vector data corresponding to a certain map image to a serialized representation of vector data corresponding to another map image, according to an embodiment. For example, the dynamic feature controller 32 may request vector data for a basic map for a region R at zoom level Z, and, in response, the map server 18 may provide a series of vector descriptors $V_1, V_2, V_5, \ldots V_N$. At another time, the dynamic feature controller 32 may request vector data for a transit map for the region R at zoom level Z, and the map server 18 in response may provide a series of vector descriptors $V_1, V_3, \ldots V_L$. Based on the two sets of vector descriptors, the dynamic feature controller 32 may determine that, for the region R at zoom level Z, (i) both the basic map and the transit map include a map element corresponding to vector descriptor $V_1$, (ii) the basic map but not the transit map includes map elements corresponding to vector descriptors $V_2$ and $V_5$, and (iii) the transit map but not the basic map includes a map element corresponding to vector descriptor $V_3$. The dynamic feature controller 32 may generate a modification indication to indicate that in order to generate a transit map image using the vector data previously provided for rendering a basic map image, vector modifier $V_3$ is added to the previously provided vector data, while vector descriptors $V_2$ and $V_5$ are removed from the previously provided vector data. More specifically, the dynamic feature controller 32 may generate a modification indication that includes one or more add indications and one or more remove indications, each of which may identify an operation (e.g., add, remove) and an operand (e.g., a vector descriptor, a map feature or map element).

Further, in some embodiments, the dynamic feature controller 32 may determine that although a certain map element is rendered when generating both the first map image and the second map image, one or more properties of the map element must be modified to reuse the map element in rendering the second map image. For example, some or all map elements may be associated with respective depth values indicative of positioning of these map elements relative to other, partially or fully overlapping, map elements in the same area. As a more specific example, a map element that depicts a road segment and corresponds to a vector descriptor $V_i$ may be rendered at a depth $D_1$ in a basic map image but rendered at a depth $D_2$ in a transit map image. In this scenario, dynamic feature controller 32 may generate a modification indication that indicates that the depth associated with vector descriptor $V_i$, previously provided to the client device 14, should be updated to depth $D_2$.

Still further, in addition to vector data, the dynamic feature controller 32 may provide label data for the added or modified map features as a part of the modification indication or, alternatively, as a separate indication. The label data may include characters in any suitable format and, in some implementations, identifiers of map features or groups of map features to which the corresponding labels belong.

In some embodiments, in addition to vector data, the map controller 30 may provide style data that indicates how vector data should be rendered. More particularly, style data may describe such visual characteristics or properties as line thickness (e.g., width in pixels), line color, one or more fill colors, etc. In an embodiment, style data is provided for various visual styles that may be applied to the vector data. The map server also may specify which visual styles the client device should apply to various vector-based descriptions of map elements (also referred to herein as vector descriptors or simply vectors). Further, in some embodiments, the map server indicates which visual style applies to a vector-based description of a map element for a particular map type, such as terrain, transit, traffic, bicycle trail, etc. To this end, several styles, each identified by a respective unique style identifier, may be defined.

The map controller 30 may provide map data for a certain geographic region and zoom level in a non-raster format, such as vector data, to the client device 14 in a single electronic message or a series of electronic messages, depending on the embodiment. Further, in an embodiment, the map controller 30 generates map data as a set of map tile descriptors, such that each map tile descriptor describes a map tile, i.e., a portion of a map image of a certain size (e.g., 256 by 256 pixels). The size of a geographic region represented by an individual map tile may depend on the zoom level with which the map tile is associated, so that a single map tile at a lower zoom level illustrates a larger geographic area than a single map tile at a higher zoom level. The map controller 30 may generate each map tile descriptor according to a vector graphics format, and a client device, such as the client device 14 of FIG. 1, may locally generate a raster image for each tile.

With continued reference to FIG. 1, the client device 14 may include a processor 50 to execute instructions and a memory 52 to store instructions and data. The client device 14 also may include an input device 54 and an output device 56 to receive input from a user and provide output to the user, respectively. The input device 54 may include one or more of a keyboard, a mouse, and a touchscreen, and the output device 56 may include a display or monitor device such as a touchscreen or a "regular" (output-only) screen, for example. The client device 14 may include various software components, such as device drivers, operating system (OS) event handlers, etc. to control the input device 54 and the output device 56 so as to implement an interactive user interface. Further, software applications executing on the processor 50 may utilize these software components to provide an application-specific user interface.

Depending on the embodiment, the client device 14 may be a personal computer, such as a desktop computer, a laptop computer, or a tablet PC, a workstation, a portable communication device such as smartphone, or any other suitable computing device. In an embodiment, the client device 14 is a so-called thin client that depends on another computing device for certain computing and/or storage functions. For example, in one such embodiment, the memory 52 includes only volatile memory such as RAM, and a program and/or storage unit having persistent memory is external to the client device 14. In another embodiment, the memory 52 includes both volatile and persistent memory components.

A browser application 60 may include a set of computer-readable instructions that execute on the processor 50. In general, the browser application 60 accesses web pages that include content such as text, images, embedded video, etc. and instructions in a mark-up language such as Hypertext Markup Language (HTML), and renders the content on the output device 56 according to the instructions in the mark-up language. To this end, the browser application 60 may implement functions for generating and processing data packets that conform to the Hypertext Transfer Protocol (HTTP), parse HTML content, encode data according to the Secure Socket Layer (SSL) protocol, request and verify digital certificates, etc., as well as user interface functions for receiving various user commands related to navigation, rendering, and managing web page data. In some embodiments, the browser application 60 is configured to interpret instructions in a scripting language (e.g., Javascript) provided in a web page.

A dynamic map rendering engine 62 may execute as a component of the browser application 60. However, in other embodiments, a software module similar to the map rendering engine 62 may execute as a standalone application or as a component of another application. Depending on the embodiment, the dynamic map rendering engine 62 may be a plugin (e.g., a set of compiled instructions that extends the functionality of the browser application 60 and executes on the processor 50), a script (e.g., a set of instructions in a scripting language interpreted by the browser application 60 at runtime), or another suitable software component. According to one example scenario, the dynamic map rendering engine 62 is downloaded when a user operating the client device 14 visits a web page that includes an embedded interactive map. More specifically, the web page may include a first hyperlink to an online map server and a certain geographic location as well as a second hyperlink to a copy of the dynamic map rendering engine 62, which is required for rendering map data received from the online map server according to the first hyperlink.

The dynamic map rendering engine 62 may provide interactive controls via the user interface of the browser application 60, for example. The interactive controls may allow a user to select a geographic region or area, a map type (e.g., basic, traffic, transit), a zoom level, etc. According to an example scenario, user first requests a basic map of a geographic region and then requests another type of a map for the same region. The dynamic map rendering engine 62 may request and receive map data in a vector graphics format in response to user commands.

During operation, the dynamic map rendering engine 62 may receive vector data (and, in some embodiments, style data) from the map server 12, render the corresponding map image using the received vector data, and cause the map image to be displayed within a certain region allocated by the browser application 60. For example, the browser application 60 may create an HTML5 Canvas element for displaying map images. The dynamic map rendering engine 62 also may receive, from the map server 12, a modification indication that indicates one or more modifications to the received vector data for rendering another map image.

For simplicity, the client device 14 is illustrated with a single processor 50. However, the client device 14 in other embodiments may include additional processing units (not shown) such as a graphics processing unit (GPU) configured to facilitate image rendering on the output device 56, for example. Further, in an embodiment, the browser application 60 may utilize a library of graphics functions for efficiently generating a map image. For example, the memory 52 may store a plugin, such as an OpenGL® or Direct3D® library, having functions for rendering graphics which various applications executing on the client 14, including the browser application 60, may access via an application programming interface (API). In another embodiment, the memory 52 stores a plugin particularly suitable for browser applications, such as WebGL, for example. Also, in some embodiments, the memory 52 stores additional software components that facilitate efficient rendering of images via the output device 56. For example, the memory 52 may store an Adobe® Flash® plugin or an O3D plugin.

It is noted that in general, the dynamic map rendering engine 62 can operate in any suitable application. For example, a client device 70 may be a portable device such as a smartphone, for example, in which the dynamic map rendering engine 62 operates in a mapping application 74. Similar to the browser application 60, the mapping application 74 may include a set of instructions stored in a memory 72 and executable on one or more processors of the client device 70 (not shown). In some implementations, the mapping application 74 utilizes networking functions provided by a browser application executing on the client device 70 (via a corresponding browser API, for example).

In another implementation, the mapping application 74 includes at least partial browser functionality, such as the communication stack that supports TCP, IP, HTTP, etc. to access the map server 12.

Figure 4:
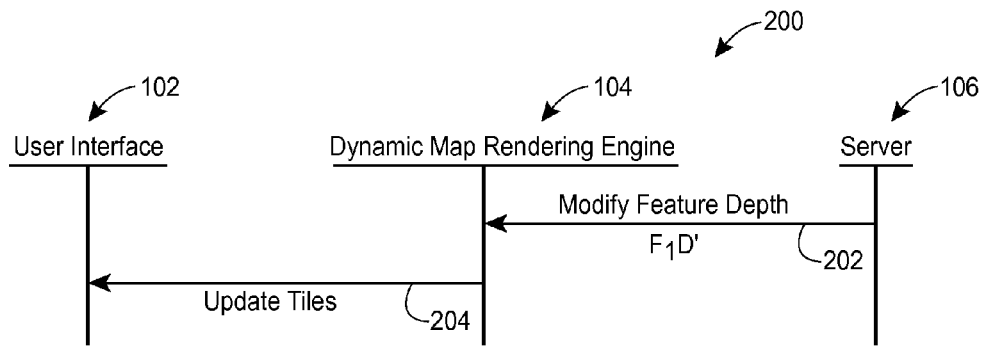
FIG. 4 is an interaction diagram that illustrates an example transfer of information to a client device for modifying an attribute of a map feature included in previously provided map data, that may be implemented in the system of FIG. 1.
Figure 5:
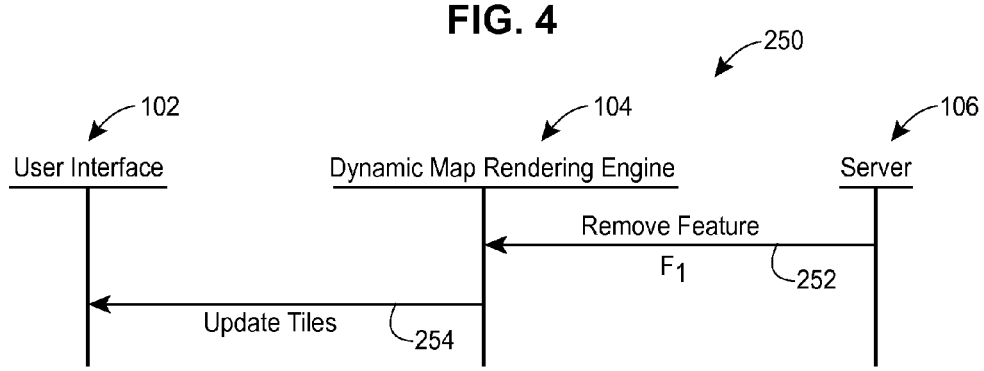
FIG. 5 is an interaction diagram that illustrates an example transfer of information to a client device for removing a map feature included in previously provided map data, that may be implemented in the system of FIG. 1.
Figure 6:
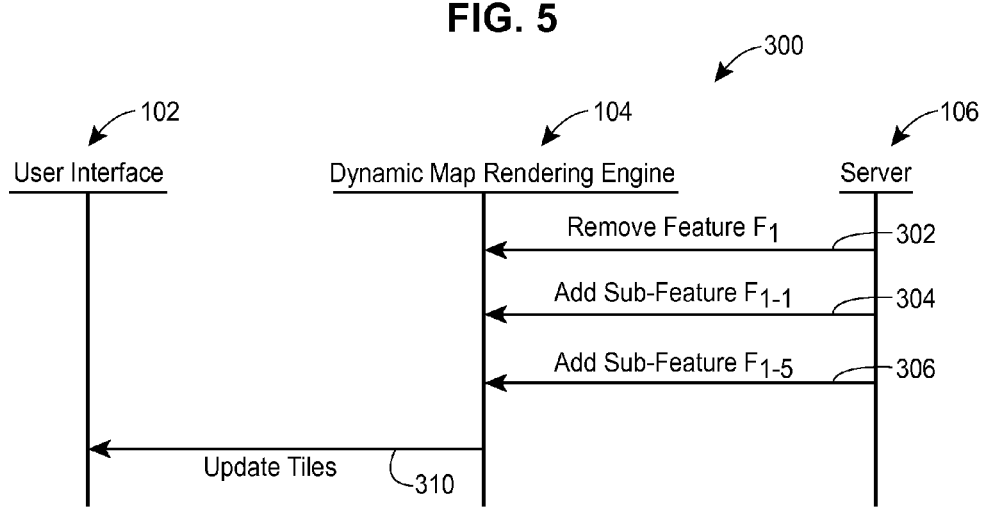
FIG. 6 is an interaction diagram that illustrates an example transfer of information to a client device for modifying a map feature associated with multiple map elements and included in previously provided map data, that may be implemented in the system of FIG. 1.

Next, to better illustrate operation of a map server and a client device in the system of FIG. 1 or a similar environment, several scenarios are considered with reference to the interaction diagrams illustrated in FIGS. 2-6. In particular, an example exchange of information between a map server and a client device for rendering two map images for a certain region is discussed with reference to FIG. 2, followed by a discussion of several specific scenarios: providing a modification indication for rendering additional map elements (FIG. 3), providing a modification indication for modifying the depth at which a map feature or element is rendered (FIG. 4), providing a modification indication for removing a map feature or element included in previously provided map data (FIG. 5), and providing a modification indication for modifying a composite map feature associated with several map elements (FIG. 6).

Figure 2:
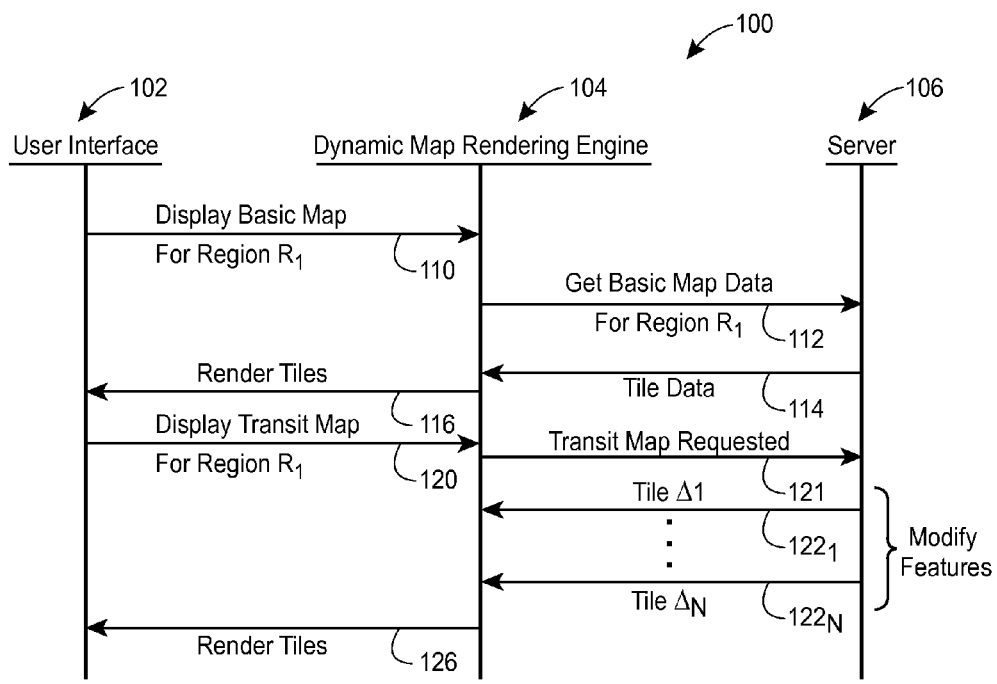
FIG. 2 is an interaction diagram that illustrates an example exchange of information for rendering two map images corresponding to a certain geographic region at a client device that may operate in the system of FIG. 1.

Referring to FIG. 2, an example message exchange 100 involves a user interface 102, included in or otherwise associated with a client device (such as the client 14 of FIG. 1), a dynamic map rendering engine 104 operating in the client device, and a server 106 (such as the map server 12 of FIG. 1). Referring back to FIG. 1, the user interface may be provided by the browser 60, while the dynamic map rendering engine 104 and the server 106 may be implemented in the components 62 and 12, respectively.

In response to a user command, the user interface 102 may generate a request 110 for basic map data for a certain region $R_1$ and provide the request to the dynamic map rendering engine 104. The request 110 may be transmitted as an electronic message internal to the client device in which the components 102 and 104 are implemented, for example. The dynamic map rendering engine 104 in turn may generate a request 112 for basic map data, to be transmitted via a communication network to the server 106. The request 112 may specify the region $R_1$ using Global Positioning Service (GPS) coordinates or in any other suitable manner. Further, the request 112 may include a map type indication to specify that map data is being requested for rendering a basic map. Still further, in some embodiments, the request 102 indicates whether any vector-based map data for the region $R_1$ is already available at the client device that implements the components 102 and 104.

In response to the request 112, the server 106 may generate a response 114 that includes map data in a non-raster format, such as in a vector graphics format, for rendering a basic map image. According to an example scenario, the response 114 includes a vector-based description of the basic map image for the region $R_1$ that does not rely on any previously provided vector data. In other words, the response 114 includes a complete description of the basic map image for the region $R_1$. The response 114 may include map data that is organized in any suitable manner, such as in a one or several tile descriptors $T_1, T_2, \ldots T_N$. In general, map data may be provided for any number of tiles, including a single tile. For each tile, the response 112 may describe various features $F_1, F_2$, etc., each of which may be specified using one or several vector descriptors in accordance with a suitable vector graphics format (as indicated above, a feature may be associated with a single map element or a group of map elements). Features may correspond to simple map elements such as buildings or more complex groupings of map elements. In some embodiments, the response 114 may provide unique identifiers for the map features for use in future identification. The response 114 in some embodiments additionally includes style data that specifies various visual attributes of the map elements.

The dynamic map rendering engine 104 may render the basic map image, provide the basic map image to the user interface 102 and generate a corresponding event 116, and store the received map data (and, when available, style data) in a memory for future use. In an embodiment, the dynamic map rendering engine 104 additionally stores an indication that the map data is associated with a basic map.

In the scenario of FIG. 2, the user later decides to change the map type from basic to transit without changing the geographic coordinates and activates the appropriate control via the user interface 102. In response, the user interface 102 generates a request 120 for transit map data and forwards the request 120 to the dynamic map rendering engine 104, which in turn provides an indication 121 to the server 106 that a different map image is to be rendered at the client device. In an embodiment, the indication 121 is a request for transit map data similar to the request 112. In another embodiment, the indication 121 specifically requests modification data for modifying the previously provided map data so as to render a transit map image.

In an embodiment, the server 106 provides a modification indication to the client device as a series of electronic messages $122_1 \ldots 122_N$. In another embodiment, however, the modification indication is provided as a single message. Each of the messages $122_1 \ldots 122_N$ may include an indication of how vector data for the corresponding tile $T_1 \ldots T_N$ is to be modified. In some scenarios, however, only some of the tiles $T_1 \ldots T_N$ described in the response 114 are modified. For example, a map tile that depicts a body of water may have the same appearance when displayed as a portion of a basic map or as a portion of a transit map.

For each tile being modified, the message $122_i$ may provide one or more modification descriptors $M_1, M_2, \ldots M_M$. In general, a modification descriptor may specify a vector descriptor for a map elements to be added to previously provided map data, identify a map element in the previously provided map data to be removed, specify a new value for a property of a map element in the previously provided map data, etc. In an embodiment, each of the modification descriptors $M_1, M_2, \ldots M_M$ identifies the operation to be performed, such as add, delete, modify, modify depth, etc., and also includes one or more operands or parameters such as a vector descriptor for a map feature or map element being added, an identifier of a map feature or map element being removed, etc.

Upon receiving the messages $122_1 \ldots 122_N$, the dynamic map rendering engine 104 map render the tiles for the requested transit map image using some or all of the vector data provided in the response 114 and the modification indication provided in the messages $122_1 \ldots 122_N$. More specifically, the dynamic map rendering engine 104 may interpret the previously provided vector descriptors, modified according to the messages $122_1 \ldots 122_N$, to render a raster transit map image, and generate an event 126 to cause the transit map image to be rendered via the user interface 102. The dynamic map rendering engine 104 may also store the modified map data in the memory. In an embodiment, the dynamic map rendering engine 104 stores both the originally provided map data and the modified map data as different versions of map data.

Figure 3:
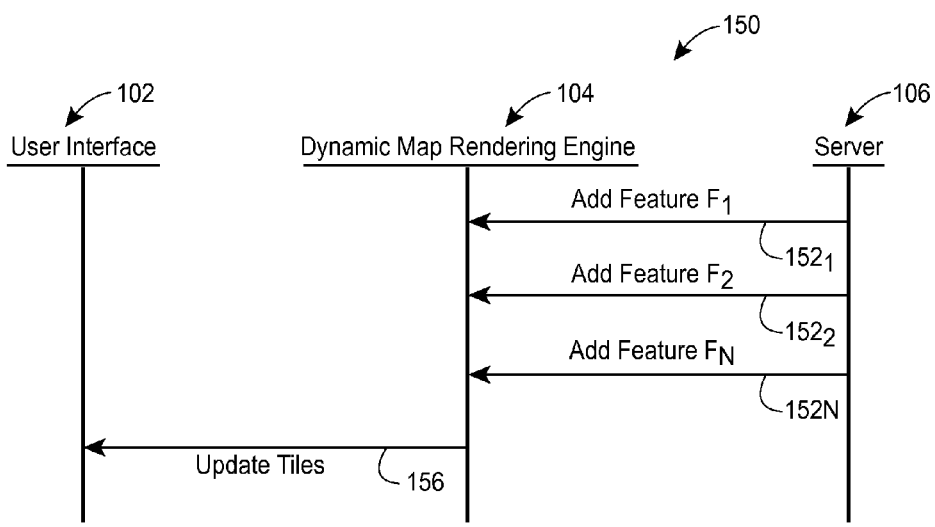
FIG. 3 is an interaction diagram that illustrates an example transfer of information to a client device for rendering additional map features in conjunction with previously provided map data, that may be implemented in the system of FIG. 1.

During an example message exchange 150 illustrated in FIG. 3, the map server 106 provides vector descriptors of additional map features to the dynamic map rendering engine 104 via respective messages $152_1 \ldots 152_N$. The additional map features are used with some or all of previously provided map data to render a new map image at the client device that implements the user interface 102 and the dynamic map rendering engine 104. In an embodiment, the messages $152_1 \ldots 152_N$ describe additions to a certain map tile. In other embodiments, the messages $152_1 \ldots 152_N$ are not associated with any particular tile.

Each of the messages $152_1 \ldots 152_N$ may include a description, in a vector graphics format or other suitable non-raster format, of a map feature having one or more map elements. A message 152 also may include a depth indication that specifies how the corresponding map feature is rendered relative to another map feature or element disposed at approximately the same location. For example, a new map feature added via one of the messages $152_1 \ldots 152_N$ may be a segment of railroad tracks, and the previously provided may include a map feature that is a segment of a road. Depending on the respective depth indications of the new map feature and the previously provided map feature, the segment of the railroad tracks may be rendered over or under the segment of the road at the point where the railroad tracks and road intersect.

Upon receiving the messages $152_1 \ldots 152_N$, the dynamic map rendering engine 104 may render a new map image and generate an event 156 so as to cause the new map image to be displayed at the user interface 102. In an embodiment, the dynamic map rendering engine 104 also stores the augmented map data in a memory as a new version of map data.

Referring to FIG. 4, an example message exchange 200 may occur when the server 106 determines that a certain map feature included in previously provided map data is rendered in a new map image at a new depth. The server 106 may generate and transmit to the dynamic map rendering engine 104 a modification indication 202 which indicates, for a map feature identified by a unique feature identifier, a new depth at which the map feature is to be rendered. In another embodiment, the modification indication 202 indicates new depth values for several map features or elements. Upon receiving the modification indication 202, the dynamic map rendering engine 104 may render a new map image in view of the modification indication 202 and generate an event 204 so as to cause the new map image to be displayed at the user interface 102.

Further, an example message exchange 250 of FIG. 5 may occur when the server 106 determines that a certain map feature included in previously provided map data is not rendered in a new map image. The server 106 may generate and transmit to the dynamic map rendering engine 104 a modification indication 252 which identifies a map feature using a unique feature identifier, for example. In another embodiment, modification indication 252 identifies an individual map element using an appropriate identifier of the map element. Further, in some embodiments, the modification indication 252 identifies several map features or elements to be removed. Upon receiving the modification indication 252, the dynamic map rendering engine 104 may render a new map image in view of the modification indication 252 and generate an event 254 so as to cause the new map image to be displayed at the user interface 102.

FIG. 6 illustrates an example message exchange 300 during which the server 106 provides modification data to the dynamic map rendering engine 104 for modifying a composite map feature having several sub-features or elements. For example, a map feature $F_1$ may include sub-features $F_{1-1}, F_{1-2}, F_{1-3}, F_{1-4}$, and $F_{1-5}$. When rendering the map feature $F_1$ as a part of a basic map, each of the sub-features $F_{1-1}, F_{1-2}, F_{1-3}, F_{1-4}$, and $F_{1-5}$ may be used. However, when rendering the map feature $F_1$ as a part of a transit map, the map feature $F_1$ may be rendered with only the sub-features $F_{1-1}$ and $F_{1-2}$. In an embodiment, the server 106 generates a message 302 that indicates that the map feature $F_1$ should be removed. Similar to the example scenario discussed above with reference to FIG. 5, the message 302 may include a unique identifier of the map feature $F_1$. The server 106 then generates messages 304 and 306 to add sub-features $F_{1-1}$ and $F_{1-5}$, respectively. Similar to the example scenario of FIG. 3, the messages 304 and 306 may include a description of the corresponding map features or elements in a non-raster format, such as a vector graphics format. Upon receiving the messages 302, 304, and 306, the dynamic map rendering engine 104 may render a new map image with a new version of the map feature $F_1$ and generate an event 310 so as to cause the new map image to be displayed at the user interface 102.

Next, several example methods that may be implemented in computing devices operating in the system of FIG. 1 or a similar environment are discussed with reference to FIGS. 7-9. These methods may be implemented as computer programs developed in any suitable programming language and stored on the tangible, non-transitory computer-readable medium (such as one or several hard disk drives) and executable on one or several processors. For example, the methods of FIGS. 7 and 8 may be implemented in the map server 12, and the method of FIG. 9 may be implemented in the client device 14. Although the methods of FIGS. 7-9 can be executed on individual computers, such as servers or personal computers (PCs), it is also possible to implement at least some of these methods in a distributed manner using several computers, e.g., in a cloud computing environment.

Figure 7:
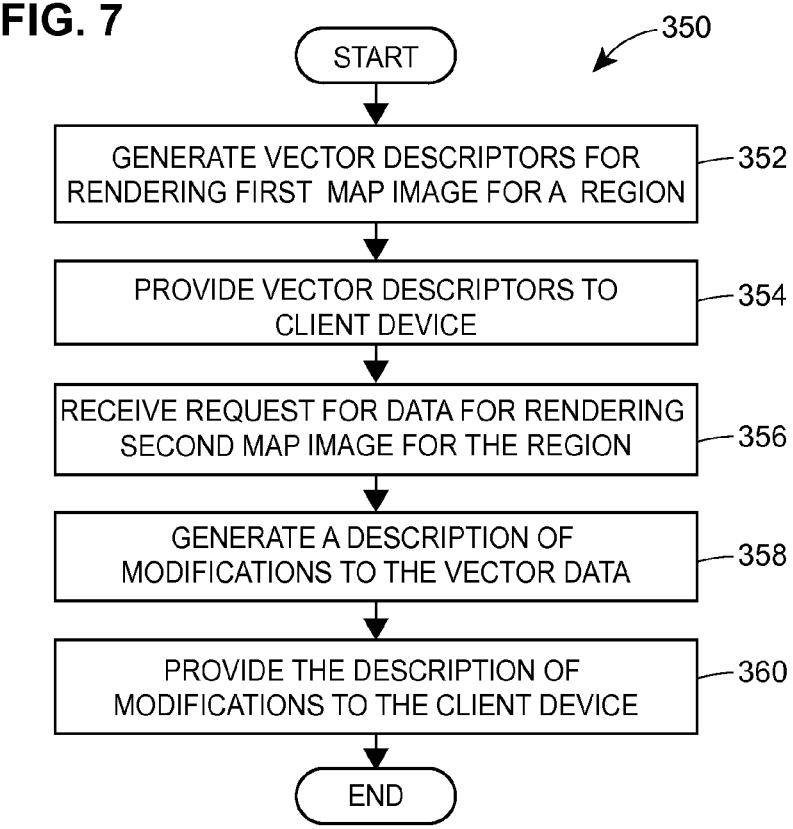
FIG. 7 is a flow diagram of an example method for generating map data for several map images at a map server that may operate in the system of FIG. 1.

Referring first to FIG. 7, an example method 350 for generating map data for several map images may be implemented in the map controller 30 of the map server 12 or a similar component of the server 106, for example. According to an embodiment, vector descriptors for rendering a first map image for a certain region are generated at block 352. The vector descriptors may conform to a vector graphics format and describe respective map elements. In some embodiments, the vector descriptors may be grouped according to map features, each including one or more map elements. Further, in some embodiments, the vector descriptors may be provided as a part of non-raster map data that also includes style data for efficiently rendering and re-rendering vector data, text-based label data, icons or symbols such as road shields, etc.

Next, at block 354, the vector descriptors are provided to a client device. For example, the vector descriptors may be transmitted as one or several electronic messages via a communication network such as the network 16 of FIG. 1, for example.

At block 356, a request for data for rendering a second map image for the same region is received. In some scenarios, the request is transmitted in response to the user selecting a different map type at the client device, as illustrated in the interaction diagram in FIG. 2, for example. A modification indication that includes a description of one or several modifications to the previously provided vector descriptors is generated at block 358 and provided to the client device at block 360.

In another scenario, the request received at block 356 is transmitted in response to the user selecting a new zoom level at which the map image corresponding to the same region and the same map type is to be rendered. For example, the vector descriptors generated at block 352 may describe several tiles at zoom level $Z_1$ of a basic map type for a geographic region R. After the user selects the zoom level $Z_2$ and an appropriate request for data is issued at block 356, a modification indication may be generated and provided to the client device at blocks 358 and 360, respectively. The client device may add, remove, or modify the previously provided vector descriptors in accordance with the modification indication, as well as re-scale some or all of the vector descriptors to render the corresponding map elements at the zoom level $Z_2$. As a more specific example, the vector descriptors provided at block 354 may include a vector-based description of a park at zoom level $Z_1$, and the same vector-based description of the park may be used to re-render the park at zoom level $Z_2$ as a part of the modified map image.

Figure 8:
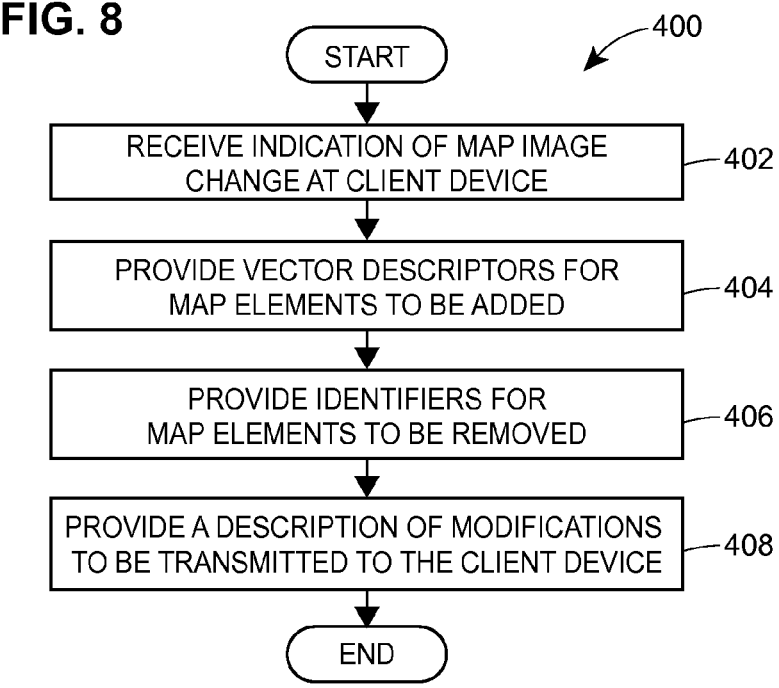
FIG. 8 is a flow diagram of an example method for generating a description of a modification of previously provided map data at a map server that may operate in the system of FIG. 1.

Referring to FIG. 8, an example method 400 for generating a description of a modification of previously provided map data that may be implemented in the map controller 30 of the map server 12 or a similar component of the server 106, for example. In an embodiment, at least some of the steps of method 400 are executed at blocks 356-360 of the method 350 discussed above.

At block 402, an indication is received that a map image is to be updated at the client device. Additions to the previously provided vector descriptors are identified, and the corresponding descriptions are generated, at block 404. At block 406, deletions of some of the previously provided vector descriptors are identified, and the corresponding descriptions of modifications are generated. As discussed above, modifications of certain map features in some scenarios are represented as deletions and additions of some of the sub-features. A modification indication, such as a description of modifications to the vector data, is transmitted to the client device 408 at a single electronic message or several electronic messages.

Figure 9:
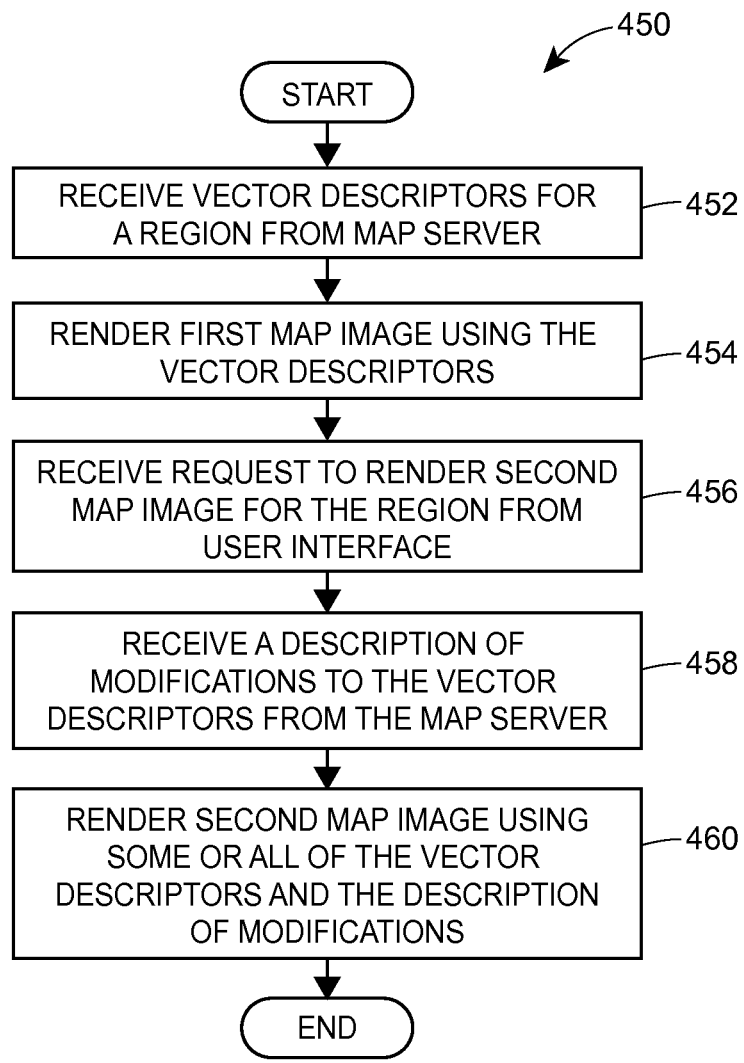
FIG. 9 is a flow diagram of an example method for rendering map images at a client device that may operate in the system of FIG. 1.

FIG. 9 is a flow diagram of an example method 450 for rendering map images that may be implemented in the dynamic map rendering engine 62 or 104, for example. At block 452, vector descriptors for a certain area or region are received, and a first map image is rendered using the received vector descriptors at block 454. To this end, the received vector data may be interpreted to generate a raster image.

Next, at block 456, a request to render a second map image is received from the user interface such as the interface of a browser application, for example. The second map image may be for the same region but may correspond to a different map type or zoom level, as discussed above. A modification indication, such as a description of one or more modifications to the vector descriptors received at block 452, is received at block 458. The second map image is then rendered using some or all of the vector descriptors received at block 452 and the description of modifications received at block 458. As discussed above, modifications to vector data in general may include additions, deletions, modifications, changes in depth, etc.

To further illustrate an example application of the techniques discussed above, FIGS. 10A and 10B maps that correspond to the same geographic region and are displayed according to the basic map type and the transit map type, respectively. A map image 500 of a basic map, depicted in FIG. 10A, may include a rendering 500 of multiple map elements such as roads and parks. As illustrated in FIG. 10B, the map image of a transit map may include the map elements of the map image 500 as well as a subway line 504 superimposed on the corresponding portions of the map image 500. Depending on the embodiment, the subway line 504 may be defined as a single map feature or several map features, each corresponding to a respective section of the tracks. Further, a subway symbol 506 may be rendered over a portion of the map image 500. Depending on the embodiment, the subway symbol 506 may be provided as an added map feature or element, as a label, or as an icon, for example. In an embodiment, the subway symbol 506 is specified as a universal resource locator (URL) that can be used to retrieved a standard subway symbol in a raster format from a server that generates standard icons.

Figure 10A:
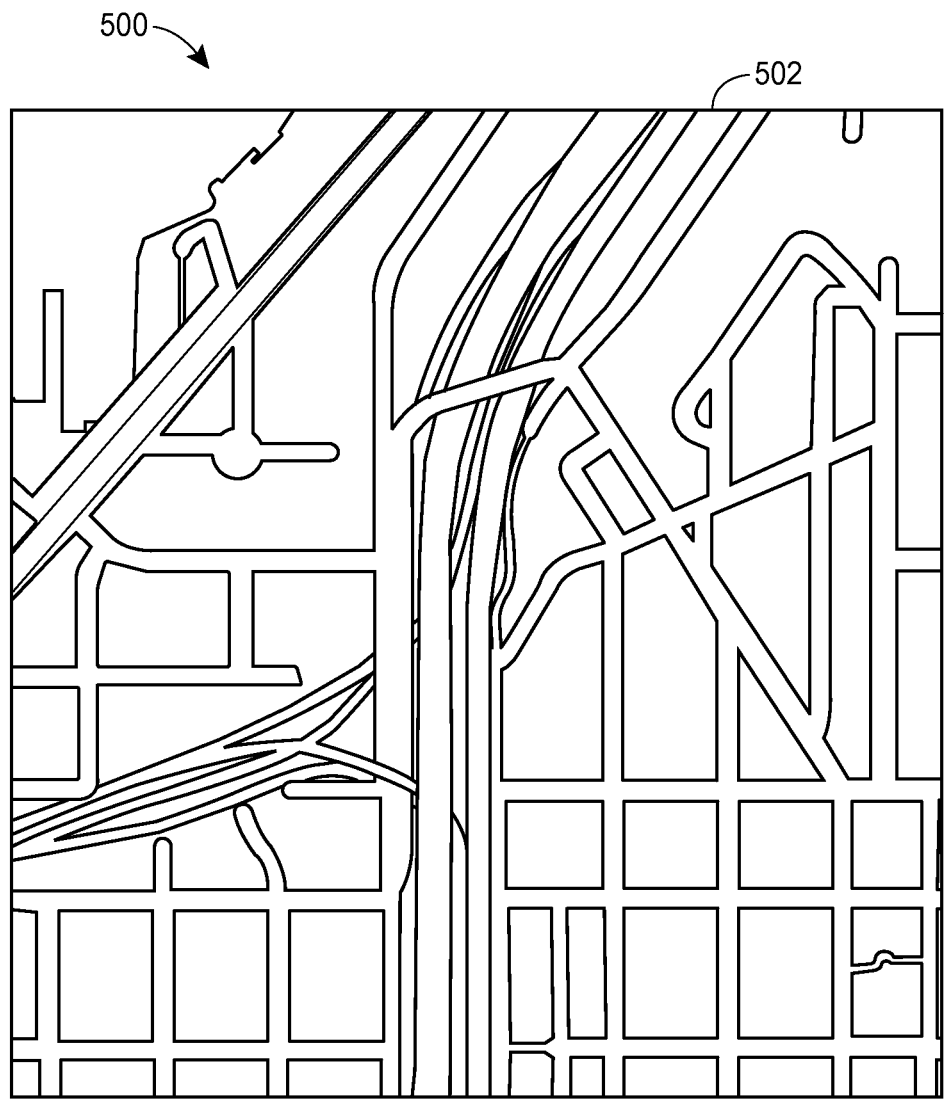
FIG. 10A is an example basic map that may be displayed at a client device operating in the system of FIG. 1.
Figure 10B:
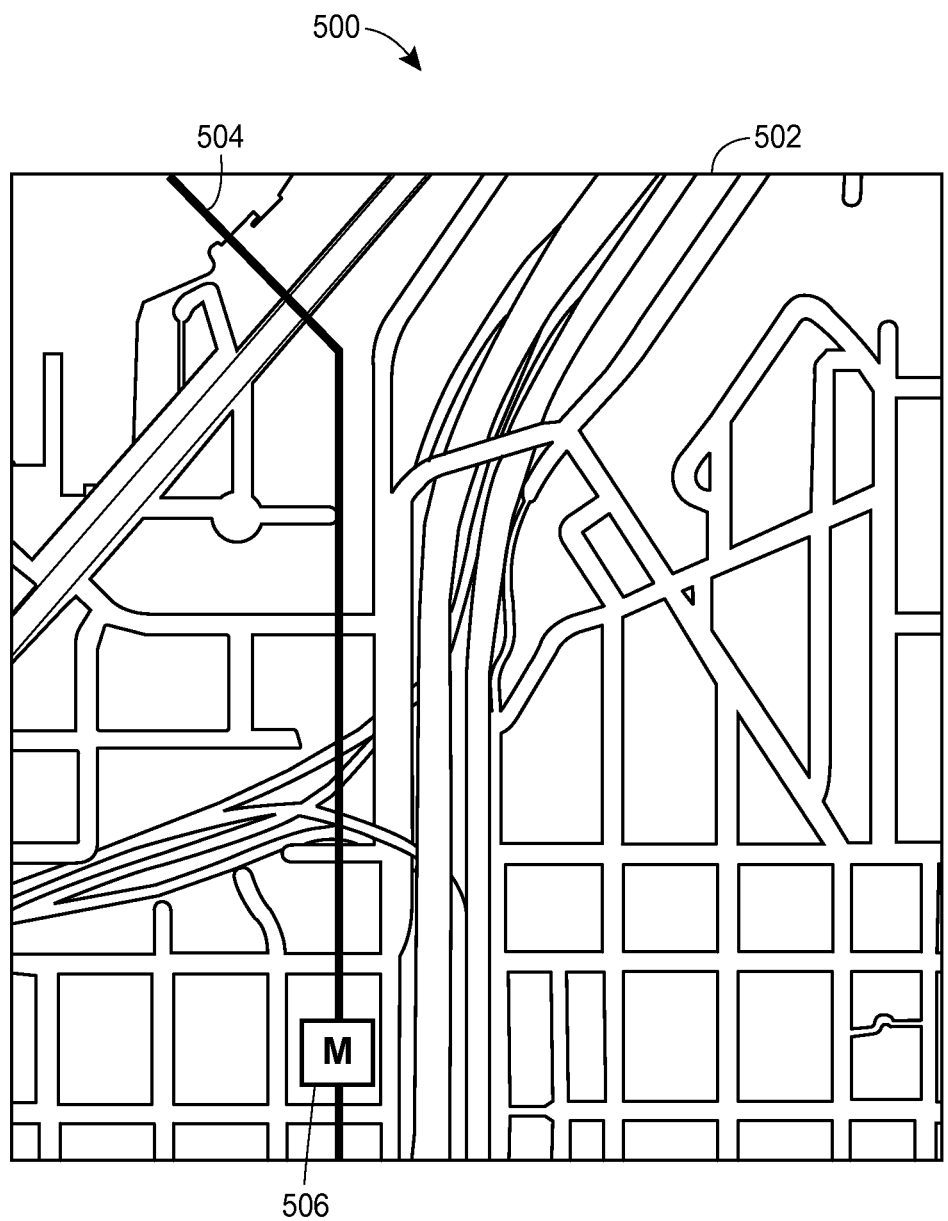
FIG. 10B is an example transit map that may be displayed after a user selects, via an interactive user interface, the transit map type at the client device displaying the basic map of FIG. 10A.

To generate the map image of FIG. 10B at a client device after the map image of FIG. 10A has been rendered at the client device, a map server may provide only a modification indication that describes, in a vector format, the one or more map features corresponding to the subway line 504. In an embodiment, the modification indication also provide a depth indication to cause the subway line 504 to appear over the roads depicted in the map image of FIG. 10A. Further, in an embodiment, the modification indication additionally includes a description of the subway symbol 506 as a label or an icon.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating map data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method in a map server for providing map data to client devices via communication networks, the method comprising:

generating first map data in a vector format organized into a set of two or more tiles, for displaying a first map image at a client device, the first map image corresponding to a perspective of a camera panned to a certain location at a certain zoom level, the map data including (i) a plurality of individually renderable map elements associated with a same tile in the set, each map element illustrating a respective physical entity, and (ii) a depth indication that specifies an initial order in which a first one of the plurality map elements is rendered relative to a second one of the plurality map elements overlapping the first one of the plurality map elements;

providing the first map data to the client device via a communication network;

generating, at the map server, modification data in a vector format specifying a difference between the first map data and a second map data, wherein the second map data is for displaying a second map image corresponding to the same perspective of the camera panned to the same location at the same zoom level, including providing a new depth indication that specifies a new order in which the first one of the plurality map elements is rendered relative to the second one of the plurality map elements; and providing the modification data to the client device via the communication network for generating the second map image using the first map data and the modification data.

2. The method of claim 1, wherein generating the modification indication includes:

identifying a map element that is not rendered as a part of the first map image but is rendered as a part of the second map image;

providing, as part of the modification data, a vector descriptor corresponding to the identified map element; and providing, in the modification data, an add indication corresponding to the identified map element to indicate that the identified map element is to be rendered using the provided vector.

3. The method of claim 1, wherein generating the modification data includes:

identifying a map element that is rendered as a part of the first map image but is not rendered as a part of the second map image, wherein the identified map element corresponds to one of a plurality of vector descriptors transmitted to the client device for rendering the first map image;

providing, in the modification data, an identifier of the one of the plurality of vector descriptors that corresponds to the identified map element; and providing, in the modification data, a remove indication to indicate that the identified map element is not to be rendered.

4. The method of claim 1, wherein generating the modification data includes:

identifying a map feature that includes a plurality of map elements, wherein the map feature is rendered as a part of the first map image with a first subset of the plurality of map elements and is rendered as a part of the second map image with a second subset of the plurality of map elements, wherein the first subset of the plurality of map elements includes at least one map element that corresponds to one of the plurality of vector descriptors transmitted to the client device for rendering the first map image;

providing, as part of the modification data, an identifier of the map feature;

providing, as part of the modification data, respective vector descriptors for each map element in the second subset of the plurality of map elements of the map feature;

providing, in the modification data, a remove indication to indicate that the identified map feature is not to be rendered with the first subset of the plurality of map elements;

providing, in the modification data, an add indication to indicate that the identified map feature is to be rendered with the second subset of the plurality of map elements.

5. The method of claim 1, wherein each map element is one of a road and a building.

6. The method of claim 1, wherein the first map image corresponds to a first map type, and wherein receiving the indication that the second map image for the selected geographic region is to be rendered at the client device includes:

receiving, from the client device, an indication of a second map type according to which the second map image is to be rendered at the client device; wherein:
the first map type is one of basic map, terrain map, transit map, and traffic map, and
the second map type is another one of basic map, terrain map, transit map, and traffic map.

7. The method of claim 1, further comprising:
receiving a first request for the first map data from the client device; and
receiving a second request for the second map data from the client device;
wherein the first map data and the modification data are provided in response to the first request and the second request, respectively.

8. The method of claim 1, wherein each of the first map image and the second map image is made up of a plurality of tiles of equal size, and wherein generating the modification data includes generating, for two or more of the plurality of tiles, a respective list of modifications to the sub-set of the plurality of vector descriptors associated with the tile, wherein each list of modifications is transmitted to the client device via the communication network in a separate electronic message.

9. A tangible non-transitory computer-readable medium having instructions stored thereon that, when executed by one or more processors, cause the one or more processors to:
generate first map data in a vector format organized into a set of two or more tiles, for displaying a first map image at a client device, the first map image corresponding to a perspective of a camera panned to a certain location at a certain zoom level, the first map data including (i) a plurality of individually renderable map elements associated with a same tile in the set, each map element illustrating a respective physical entity, and (ii) a depth indication that specifies an initial order in which a first one of the plurality map elements is rendered relative to a second one of the plurality map elements overlapping the first one of the plurality map elements;
provide the first map data to the client device via a communication network;
provide, at a map server, modification data in a vector format specifying a difference between the first map data and a second map data, wherein the second map data is for displaying a second map image corresponding to the same perspective of the camera panned to the same location at the same zoom level, including provide a new depth indication that specifies a new order in which the first one of the plurality map elements is rendered relative to the second one of the plurality map elements; and
provide the modification data to the client device via the communication network for generating the second map image using the first map data and the modification data.

10. The computer-readable medium of claim 9, wherein modification data further describes at least one of:
(i) a new map element, not included in the first map data, to be rendered in conjunction with at least some of the map data to generate the second map image; and
(ii) a map element included in the first map image that is not to be rendered when generating the second map image.

11. The computer-readable medium of claim 10, wherein the first map data includes a plurality of vector descriptors, each indicating a geometry of a respective map element in accordance with a vector graphics format.

12. The computer-readable medium of claim 11, wherein:
the first map data includes a map feature associated with two or more of the plurality of vector descriptors, wherein the map feature is associated with a unique feature identifier; and
the modification indication includes (i) the feature identifier of the map feature, and (ii) a remove indication to indicate that the map feature is not to be rendered when generating the second map image.

13. The computer-readable medium of claim 9, wherein the first map image corresponds to a first map type, and the second map image corresponds to a second map type, wherein the first map type is one of basic map, terrain map, transit map, and traffic map, and the second map type is another one of basic map, terrain map, transit map, and traffic map.

14. A computing device operating in a communication network, the computing device comprising:
one or more processors;
a display device coupled to the one or more processors; and
a tangible computer-readable memory coupled to the one or more processors, wherein the memory stores instructions configured to:
receive first map data in a vector format organized into a set of two or more tiles, for displaying a first map image via the display device, the first map image corresponding to a perspective of a camera panned to a certain location at a certain zoom level, the first map data including (i) a plurality of individually renderable map elements associated with a same tile in the set, each map element illustrating a respective physical entity, and (ii) a depth indication that specifies an initial order in which a first one of the plurality map elements is rendered relative to a second one of the plurality map elements overlapping the first one of the plurality map elements,
receive, from a map server via a communication network, modification data in a vector format specifying a difference between the first map data and a second map data, wherein the second map data is for displaying a second map image corresponding to the same perspective of the camera panned to the same location at the same zoom level, including receive a new depth indication that specifies a new order in which the first one of the plurality map elements is rendered relative to the second one of the plurality map elements, and
generate the second map image using the first map data and the modification data, including render the first one of the plurality map elements and the second one of the plurality map elements according to the new order.

* * * * *